United States Patent
Zhang et al.

(10) Patent No.: US 9,801,204 B2
(45) Date of Patent: Oct. 24, 2017

(54) SENDING NODE AND BUFFER STATUS REPORTING METHOD

(71) Applicant: Huawei Technologies Co., Ltd., Shenzhen (CN)

(72) Inventors: Tao Zhang, Beijing (CN); Bo Lin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 21 days.

(21) Appl. No.: 14/557,008

(22) Filed: Dec. 1, 2014

(65) Prior Publication Data
US 2015/0117245 A1    Apr. 30, 2015

Related U.S. Application Data

(63) Continuation of application No. PCT/CN2013/086316, filed on Oct. 31, 2013.

(51) Int. Cl.
H04L 12/56    (2006.01)
H04W 72/12    (2009.01)

(52) U.S. Cl.
CPC ................ *H04W 72/1284* (2013.01)

(58) Field of Classification Search
USPC .......... 370/252, 328, 412, 428, 429
See application file for complete search history.

(56) References Cited

U.S. PATENT DOCUMENTS

2009/0125650 A1    5/2009 Sebire
2010/0074222 A1*   3/2010 Wu ................. H04L 1/1874
                                          370/331
(Continued)

FOREIGN PATENT DOCUMENTS

CN    102111751 A    6/2011
CN    103201977 A    7/2013
(Continued)

OTHER PUBLICATIONS

3 GPP TS 36.323 V11.2.0, "3rd Generation Partnership Project; Technical Specification Group Radio Access Network; Evolved Universal Terrestrial Radio Access (E-UTRA); Packet Data Convergence Protocol (DCP) Specification (Release 11)," Mar. 2013, 27 pages.
(Continued)

*Primary Examiner* — Kwang B Yao
*Assistant Examiner* — Nguyen Ngo
(74) *Attorney, Agent, or Firm* — Slater Matsil, LLP

(57) ABSTRACT

A sending node and a buffer status reporting method are disclosed. The method includes: classifying at least two RLC entities included in a sending node as at least one first RLC entity and one second RLC entity, where all the RLC entities are associated with a PDCP entity included in the sending node; and in a case in which a buffer of the first RLC entity includes to-be-sent data, generating a first buffer status report BSR based on a size of the to-be-sent data in the buffer of the first RLC entity, and sending the generated first BSR to a receiving node corresponding to the first RLC entity. By classification of the first RLC entity and the second RLC entity, the second RLC entity is exclusively associated with buffer status reporting of the PDCP entity.

19 Claims, 7 Drawing Sheets

(56) References Cited

U.S. PATENT DOCUMENTS

| | | |
|---|---|---|
| 2012/0281564 A1 | 11/2012 | Zhang et al. |
| 2013/0114445 A1* | 5/2013 | Wen ............... H04L 5/0007 370/252 |
| 2013/0195060 A1 | 8/2013 | Park et al. |
| 2014/0056243 A1* | 2/2014 | Pelletier .......... H04W 74/04 370/329 |
| 2014/0192740 A1* | 7/2014 | Ekpenyong ....... H04L 5/0035 370/329 |
| 2015/0098322 A1* | 4/2015 | Chen ............. H04W 72/0413 370/230 |
| 2015/0117241 A1* | 4/2015 | Koc ............... H04W 36/0055 370/252 |
| 2015/0188680 A1 | 7/2015 | Li et al. |
| 2016/0088647 A1* | 3/2016 | Yi ................. H04W 72/1205 370/329 |
| 2016/0165486 A1 | 6/2016 | Uchino et al. |
| 2016/0286604 A1* | 9/2016 | Heo ............... H04W 28/0278 |

FOREIGN PATENT DOCUMENTS

| | | |
|---|---|---|
| CN | 103369509 A | 10/2013 |
| JP | 2015032877 A | 2/2015 |
| JP | 2015532566 A | 11/2015 |
| NO | 2015045268 A1 | 4/2015 |
| RU | 2463643 C2 | 10/2012 |
| RU | 2469481 C2 | 12/2012 |
| WO | 2011040793 A2 | 4/2011 |

OTHER PUBLICATIONS

"Some Consideration on U-Plane Alternative 3C," Source: CATT, Agenda Item: 7.2.1, Document for: Discussion and Decision, 3GPP TSG RAN WG2 Meeting #83bis, R2-133375, Ljubljana, Slovenia, Oct. 7-11, 2013, 2 pages.

"Uplink Scheduling and BSRs with Dual Connectivity," Agenda Item: 7.2.3, Source: Ericsson, Document for: Discussion, Approval, 3GPP TSG-RAN WG2 Meeting #83bis, R2-133412, Ljubljana, Slovenia, Oct. 7-11, 2013, 4 pages.

"MAC Layer Aspects for Dual Connectivity," Source: Intel Corporation, Agenda Item: 7.2.3, Document for: Discussion and Decision, 3GPP TSG RAN WG2 Meeting #83bis, R2-133496, Ljubljana, Slovenia, Oct. 7-11, 2013, 3 pages.

* cited by examiner

SENDING NODE AND BUFFER STATUS REPORTING METHOD

This application is a continuation of International Application No. PCT/CN2013/086316, filed on Oct. 31, 2013, which is incorporated herein by reference in its entirety.

TECHNICAL FIELD

The present invention relates a radio network, and in particular, to a sending node in a radio network and a buffer status reporting method.

BACKGROUND

In a traditional radio network, a sending node is in a one-to-one correspondence with a receiving node, that is, one sending node sends data to only one receiving node. Further, to-be-sent data is stored in a buffer inside a sending node, for example, in a buffer of a Packet Data Convergence Protocol (PDCP) entity and in a buffer of a Radio Link Control (RLC) entity, where the RLC entity is associated with the PDCP entity.

With the development of radio network technologies, a sending node and receiving nodes may be in a one-to-many correspondence, that is, a sending node may send data to two or more receiving nodes. In this case, the sending node generally includes two or more RLC entities that are respectively corresponding to the two or more receiving nodes, and the two or more RLC entities are all associated with a PDCP entity.

For example, in a case in which a sending node sends data to a receiving node A and a receiving node B, the sending node includes RLC entities A and B that are respectively corresponding to the receiving nodes A and B; and the RLC entities A and B are both associated with a PDCP entity.

Generally, before sending data, the sending node needs to report a buffer status to the receiving node, so as to request the receiving node to allocate a sending resource, where the buffer status indicates a size of to-be-sent data. In the prior art, in a case in which a sending node and receiving nodes are in a one-to-many correspondence, because all RLC entities are associated with a PDCP entity, Buffer Status Reports (BSR) for all receiving nodes are triggered when there is to-be-sent data in a buffer of the PDCP entity; and as a result, all the receiving nodes allocate sending resources for this part of data, thereby causing a waste of resources.

For example, in a case in which a sending node sends data to receiving nodes A and B, if there is a to-be-sent data in a PDCP entity, the sending node triggers BSRs A and B. The BSR A is used to report a buffer status to the receiving node A based on a size of to-be-sent data in a buffer of the PDCP entity and in a buffer of an RLC entity A. The BSR B is used to report a buffer status to the receiving node B based on a size of to-be-sent data in the buffer of the PDCP entity and in a buffer of an RLC entity B.

Because the BSRs A and B both calculate the size of the to-be-sent data in the buffer of the PDCP entity, the receiving nodes A and B both allocate a sending resource to the to-be-sent data in the buffer of the PDCP entity, which obviously causes a waste.

SUMMARY

In view of this, the technical problem to be solved by the present invention is how to avoid a waste of sending resources in a case in which a sending node and receiving nodes are in a one-to-many correspondence.

To solve the foregoing technical problem, according to a first aspect of the present invention, a buffer status reporting method is provided. The method is applied to a sending node that includes a Packet Data Convergence Protocol (PDCP) entity and at least two Radio Link Control (RLC) entities, where the at least two RLC entities are all associated with the PDCP entity. The buffer status reporting method includes: classifying the at least two RLC entities as at least one first RLC entity and one second RLC entity; in a case in which a buffer of the first RLC entity includes to-be-sent data, generating a first buffer status report BSR based on a size of the to-be-sent data in the buffer of the first RLC entity; and sending the first BSR to a receiving node corresponding to the first RLC entity.

For the foregoing buffer status reporting method, in a possible implementation manner, the method further includes: in a case in which a buffer of the PDCP entity and/or the second RLC entity includes to-be-sent data, generating a second BSR based on a size of to-be-sent data in buffers of the PDCP entity and the second RLC entity; and sending the second BSR to a receiving node corresponding to the second RLC entity.

For the foregoing buffer status reporting method, in a possible implementation manner, before the classifying the at least two RLC entities as at least one first RLC entity and one second RLC entity, the method further includes: receiving a first indication from a receiving node, where the first indication is used to specify an RLC entity, which is only used to send a control protocol data unit (PDU), in the at least two RLC entities; and the classifying the at least two RLC entities as at least one first RLC entity and one second RLC entity includes: classifying the RLC entity specified by the first indication as the first RLC entity.

For the foregoing buffer status reporting method, in a possible implementation manner, before the classifying the at least two RLC entities as at least one first RLC entity and one second RLC entity, the method further includes: receiving a second indication from a receiving node, where the second indication is used to specify an RLC entity, which is used to send a PDU submitted by the PDCP entity, in the at least two RLC entities; and the classifying the at least two RLC entities as at least one first RLC entity and one second RLC entity includes: classifying the RLC entity specified by the second indication as the second RLC entity.

For the foregoing buffer status reporting method, in a possible implementation manner, the at least two RLC entities are all associated with the PDCP entity on a same bearer.

For the foregoing buffer status reporting method, in a possible implementation manner, the at least two RLC entities are all in acknowledged mode (AM), or all in unacknowledged mode (UM); or a part of the at least two RLC entities are in AM and the other part of the at least two RLC entities are in UM.

For the foregoing buffer status reporting method, in a possible implementation manner, the sending node is a terminal, a base station, or an access point.

To solve the foregoing technical problem, according to a second aspect of the present invention, a sending node is provided. The sending node includes a Packet Data Convergence Protocol (PDCP) entity and at least two Radio Link Control (RLC) entities, where the at least two RLC entities are all associated with the PDCP entity. The sending node further includes: a configuring unit, configured to classify the at least two RLC entities as at least one first RLC entity and one second RLC entity; a generating unit, connected to the configuring unit and configured to, in a case in which a buffer of the first RLC entity includes to-be-sent data, generate a first BSR based on a size of the to-be-sent data in the buffer of the first RLC entity; and a sending unit, connected to the generating unit and configured to send the first BSR to a receiving node corresponding to the first RLC entity.

For the foregoing sending node, in a possible implementation manner, the generating unit is further configured to, in a case in which a buffer of the PDCP entity and/or the second RLC entity includes to-be-sent data, generate a second BSR based on a size of to-be-sent data in buffers of the PDCP entity and the second RLC entity; and the sending unit is further configured to send the second BSR to a receiving node corresponding to the second RLC entity.

For the foregoing sending node, in a possible implementation manner, the sending node further includes a first receiving unit that is connected to the configuring unit. The first receiving unit is configured to receive a first indication from a receiving node, where the first indication is used to specify an RLC entity, which is only used to send a control protocol data unit PDU, in the at least two RLC entities; and the configuring unit is further configured to classify the RLC entity specified by the first indication as the first RLC entity.

For the foregoing sending node, in a possible implementation manner, the sending node further includes a second receiving unit that is connected to the configuring unit. The second receiving unit is configured to receive a second indication from a receiving node, where the second indication is used to specify an RLC entity, which is used to send a PDU submitted by the PDCP entity, in the at least two RLC entities; and the configuring unit is further configured to classify the RLC entity specified by the second indication as the second RLC entity.

For the foregoing sending node, in a possible implementation manner, the at least two RLC entities are all associated with the PDCP entity on a same bearer.

For the foregoing sending node, in a possible implementation manner, the at least two RLC entities are all in acknowledged mode (AM), or all in unacknowledged mode (UM); or a part of the at least two RLC entities are in AM and the other part of the at least two RLC entities are in UM.

For the foregoing sending node, in a possible implementation manner, the sending node is a terminal, a base station, or an access point.

According to the first aspect and the second aspect of the present invention, in a case in which a sending node and receiving nodes are in a one-to-many correspondence, that is, in a case in which the sending node includes a PDCP entity and at least two RLC entities, by classifying all RLC entities of the sending node as at least one first RLC entity and one second RLC entity, where the second RLC entity is the only RLC entity that is associated with buffer status reporting of the PDCP entity, it can be achieved that only one receiving node allocates a sending resource to to-be-sent data in a buffer of the PDCP entity; thereby effectively avoiding a waste of sending resources.

To solve the foregoing technical problem, according to a third aspect of the present invention, a buffer status reporting method is provided. The method is applied to a sending node that includes a Packet Data Convergence Protocol (PDCP) entity and at least two Radio Link Control (RLC) entities, where the at least two RLC entities are all associated with the PDCP entity. The buffer status reporting method includes: in a case in which a buffer of any one of the RLC entities or the PDCP entity includes to-be-sent data, generating a buffer status report (BSR) based on a size of to-be-sent data in buffers of the at least two RLC entities and the PDCP entity; and sending the BSR to a receiving node corresponding to any one of the RLC entities.

For the foregoing buffer status reporting method, in a possible implementation manner, the at least two RLC entities are all associated with the PDCP entity on a same bearer.

For the foregoing buffer status reporting method, in a possible implementation manner, the at least two RLC entities are all in acknowledged mode (AM), or all in unacknowledged mode (UM); or a part of the at least two RLC entities are in AM and the other part of the at least two RLC entities are in UM.

For the foregoing buffer status reporting method, in a possible implementation manner, the sending node is a terminal, a base station, or an access point.

To solve the foregoing technical problem, according to a fourth aspect of the present invention, a sending node is provided. The sending node includes a Packet Data Convergence Protocol (PDCP) entity and at least two Radio Link Control (RLC) entities, where the at least two RLC entities are all associated with the PDCP entity. The sending node further includes: a generating unit, configured to, in a case in which a buffer of any one of the RLC entities or the PDCP entity includes to-be-sent data, generate a buffer status report (BSR) based on a size of to-be-sent data in buffers of the at least two RLC entities and the PDCP entity; and a sending unit, connected to the generating unit and configured to send the BSR to a receiving node corresponding to any one of the RLC entities.

For the foregoing sending node, in a possible implementation manner, the at least two RLC entities are all associated with the PDCP entity on a same bearer.

For the foregoing sending node, in a possible implementation manner, the at least two RLC entities are all in acknowledged mode (AM), or all in unacknowledged mode (UM); or a part of the at least two RLC entities are in AM and the other part of the at least two RLC entities are in UM.

For the foregoing sending node, in a possible implementation manner, the sending node is a terminal, a base station, or an access point.

According to the third aspect and the fourth aspect of the present invention, in a case in which a sending node and receiving nodes are in a one-to-many correspondence, that is, in a case in which the sending node includes a PDCP entity and at least two RLC entities, a BSR, which is triggered when there is to-be-sent data in a buffer of any one of the RLC entities or the PDCP entity, is generated based on a size of to-be-sent data in buffers of all the RLC entities and the PDCP entity; and the generated BSR is sent to a receiving node corresponding to any one of the RLC entities. Therefore, it can be achieved that only one receiving node allocates a sending resource to the to-be-sent data in the buffer of the PDCP entity; thereby effectively avoiding a waste of sending resources.

According to detailed descriptions of exemplary embodiments in the following accompanying drawings, other features and aspects of the present invention become clearer.

BRIEF DESCRIPTION OF DRAWINGS

Accompanying drawings that are included in and form a part of the specification together with the specification show exemplary embodiments, features, and aspects of the present invention, and are used to explain the principle of the present invention.

DETAILED DESCRIPTION OF ILLUSTRATIVE EMBODIMENTS

The following describes various exemplary embodiments, features, and aspects of the present invention in detail with reference to accompanying drawings. A same reference sign in the accompanying drawings indicates components with a same or similar function. Although various aspects of an embodiment are shown in the accompanying drawings, unless otherwise specified, the accompanying drawings do not need to be drawn to scale.

The word "exemplary" for exclusive use herein means "used as an example or embodiment or for descriptive purpose." Any embodiment described herein for "exemplary" purpose does not need to be explained as being superior to or better than other embodiments.

In addition, to better describe the present invention, many specific details are provided in the following specific implementation manners. A person skilled in the art should understand that, without certain specific details, the present invention can still be implemented. In some other embodiments, methods, means, components, and circuits well known by a person skilled in the art are not described in detail, so as to highlight the subject of the present invention.

As described in the background, in a case in which a sending node and receiving nodes are in a one-to-many correspondence, that is, the sending node includes one PDCP entity and multiple RLC entities that are all associated with the PDCP entity, when there is to-be-sent data in a buffer of the PDCP entity, BSRs for all receiving nodes are generally triggered; and as a result, all the receiving nodes allocate sending resources for this part of data; thereby causing a waste of sending resources. To avoid this kind of waste of sending resources, the inventor creatively proposes that a RLC entity, among all the RLC entities included in the sending node, may be specified as a second RLC entity that is exclusively associated with buffer status reporting of the PDCP entity.

Figure 1:
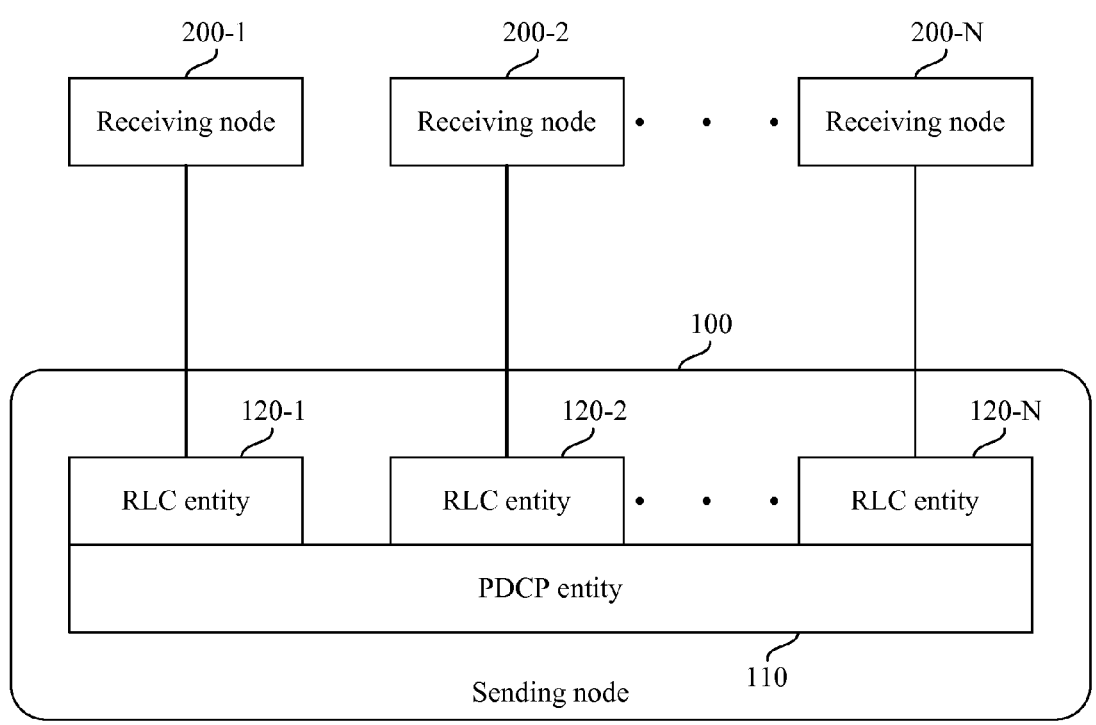
FIG. 1 is a schematic diagram of a system applicable to a buffer status reporting method according to the present invention.

FIG. 1 is a schematic diagram of a system applicable to a buffer status reporting method according to the present invention. As shown in FIG. 1, in a case in which a sending node 100 is corresponding to N receiving nodes 200-1 to 200-N, that is, the sending node 100 includes a PDCP entity 110 and at least two RLC entities 120-1 to 120-N, the RLC entities 120 in the sending node 100 may be classified as at least one first RLC entity and one second RLC entity. For example, the RLC entities 120-2 to 120-N are classified as the first RLC entities, and the RLC entity 120-1 is classified as the second RLC entity.

The RLC entities 120-1 to 120-N are respectively corresponding to the receiving nodes 200-1 to 200-N, and N is a positive integer greater than or equal to 2. All the RLC entities 120-1 to 120-N are associated with the PDCP entity 110. For example, the PDCP entity 110 is associated with all the RLC entities 120-1 to 120-N on a same bearer. In addition, the RLC entities 120-1 to 120-N may all be in acknowledged mode (AM), or may all be in unacknowledged mode (UM); or it may even further be that a part of the RLC entities 120-1 to 120-N are in AM, and the other part of the RLC entities 120-1 to 120-N are in UM.

By classification of the first RLC entity and the second RLC entity, a triggering condition of a BSR (hereinafter referred to as a first BSR) that is to be sent to a receiving node corresponding to a first RLC entity may be set to be independent of a buffer status of the PDCP entity; that is, the triggering condition of the first BSR is set to "there is to-be-sent data in a buffer of a first RLC entity." In this way, only in a case in which the buffer of the first RLC entity includes to-be-sent data, a first BSR is generated based on a size of the to-be-sent data in the buffer of the first RLC entity, and the generated first BSR is sent to the receiving node corresponding to the first RLC entity. That is, in a case in which a buffer of the PDCP entity includes to-be-sent data, only a receiving node corresponding to the second RLC entity is triggered to allocate a corresponding sending resource, thereby effectively avoiding a waste of sending resources.

Figure 2:
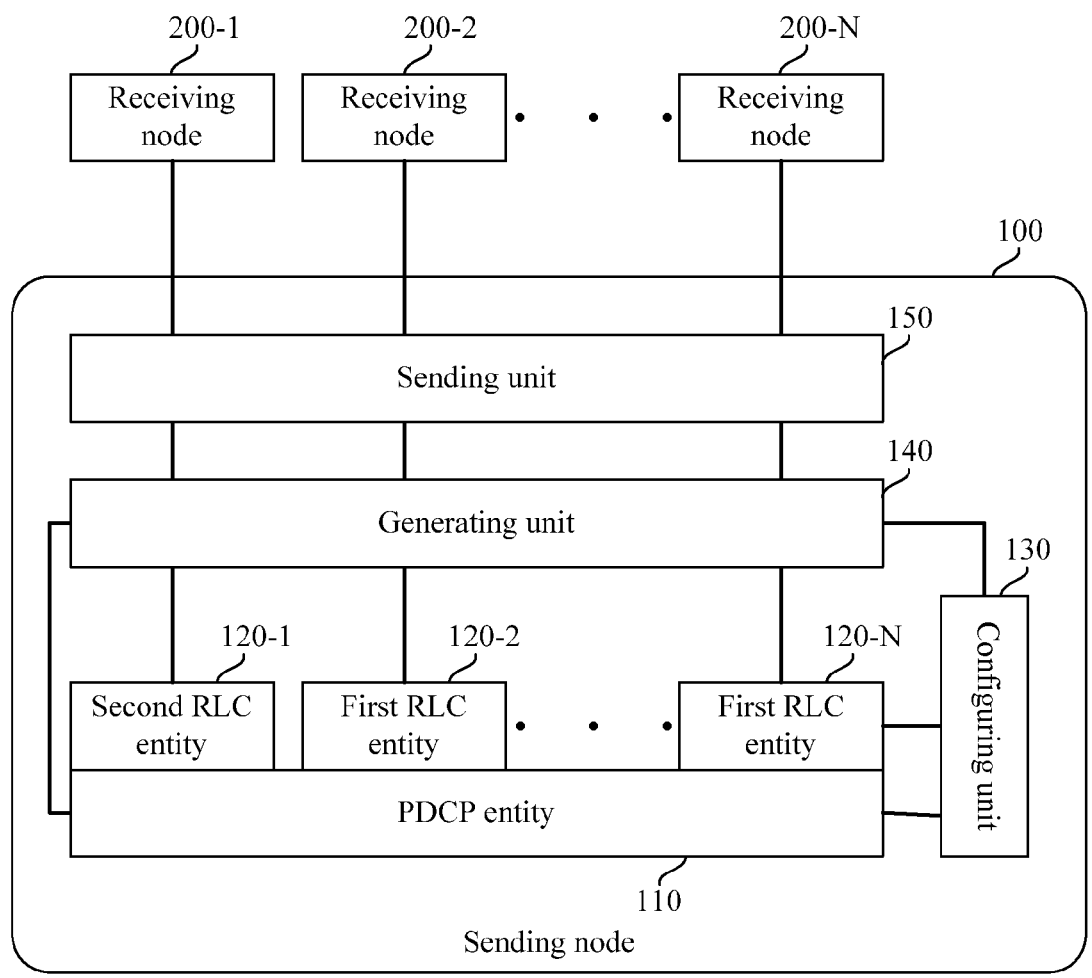
FIG. 2 is a structural block diagram of a sending node according to an embodiment of the present invention.

FIG. 2 is a structural block diagram of a sending node 100 according to an embodiment of the present invention. As shown in FIG. 2, a sending node 100 includes one PDCP entity 110 and N RLC entities 120-1 to 120-N, so as to send data to N receiving nodes 200-1 to 200-N, where N is a positive integer greater than or equal to 2. That is, the sending node 100 according to this embodiment of the present invention is applicable to a radio network architecture in which a sending node and receiving nodes are in a one-to-many correspondence. In a possible implementation manner, the sending node 100 and the receiving nodes 200 may all be terminals, base stations, or access points.

To effectively avoid a waste of resources in allocation of sending resources, as shown in FIG. 2, the sending node 100 may further include a configuring unit 130, a generating unit 140, and a sending unit 150. The configuring unit 130 is connected to the PDCP entity 110 and all RLC entities 120-1 to 120-N, and is mainly configured to classify all the RLC entities 120-1 to 120-N as at least one first RLC entity (marked as 120-2 to 120-N in FIG. 2) and one second RLC entity (marked as 120-1 in FIG. 2), where the second RLC entity 120-1 is the only RLC entity that is associated with buffer status reporting of the PDCP entity 110. The generating unit 140 is connected to the configuring unit 130 and the first RLC entities 120-2 to 120-N, and is mainly configured to, in a case in which a buffer of the first RLC entities 120-2 to 120-N includes to-be-sent data, generate a first BSR based on a size of the to-be-sent data in the buffer of the first RLC entities 120-2 to 120-N. The sending unit 150 is connected to the generating unit 140 and the receiving nodes 200-2 to 200-N, and is mainly configured to send the first BSR generated by the generating unit 140 to the receiving nodes 200-2 to 200-N corresponding to the first RLC entities 120-2 to 120-N.

In a possible implementation manner, as shown in FIG. 2, the generating unit 140 may further be connected to the PDCP entity 110 and the second RLC entity 120-1, and may be configured to: in a case in which a buffer of the PDCP entity 110 and/or the second RLC entity 120-1 includes to-be-sent data, generate a second BSR based on a size of the to-be-sent data in buffers of the PDCP entity 110 and the second RLC entity 120-1. In this implementation manner, the sending unit 150 may further be configured to send the second BSR generated by the generating unit 140 to the receiving node 200-1 corresponding to the second RLC entity 120-1.

In a specific possible implementation manner, the sending node 100 may further include a first receiving unit (which is not shown in FIG. 2, so as to simplify the drawing) that is connected to the configuring unit 130. The first receiving unit is mainly configured to receive a first indication from the receiving nodes 200-1 to 200-N. The first indication may be used to specify an RLC entity that is only used to send a control protocol data unit (PDU). In this specific implementation manner, the configuring unit 130 may further be configured to classify the RLC entity specified by the first indication as the first RLC entity.

In another specific possible implementation manner, the sending node 100 may further include a second receiving unit (which is not shown in FIG. 2, so as to simplify the drawing) that is connected to the configuring unit 130. The second receiving unit is mainly configured to receive a second indication from receiving nodes 200-1 to 200-N. The second indication may be used to specify an RLC entity that is used to send a PDU submitted by the PDCP entity 110. In this specific implementation manner, the configuring unit 130 may further be configured to classify the RLC entity specified by the second indication as the second RLC entity.

In this way, by using a configuring unit, multiple internally included RLC entities are configured as: only one RLC entity is associated with buffer status reporting of a PDCP entity. Therefore, when there is to-be-sent data in a buffer of the PDCP entity, only one receiving node is triggered to allocate a corresponding sending resource to the to-be-sent data. The sending node according to this embodiment can effectively avoid a waste of sending resources in a case in which a sending node and receiving nodes are in a one-to-many correspondence.

Figure 3:
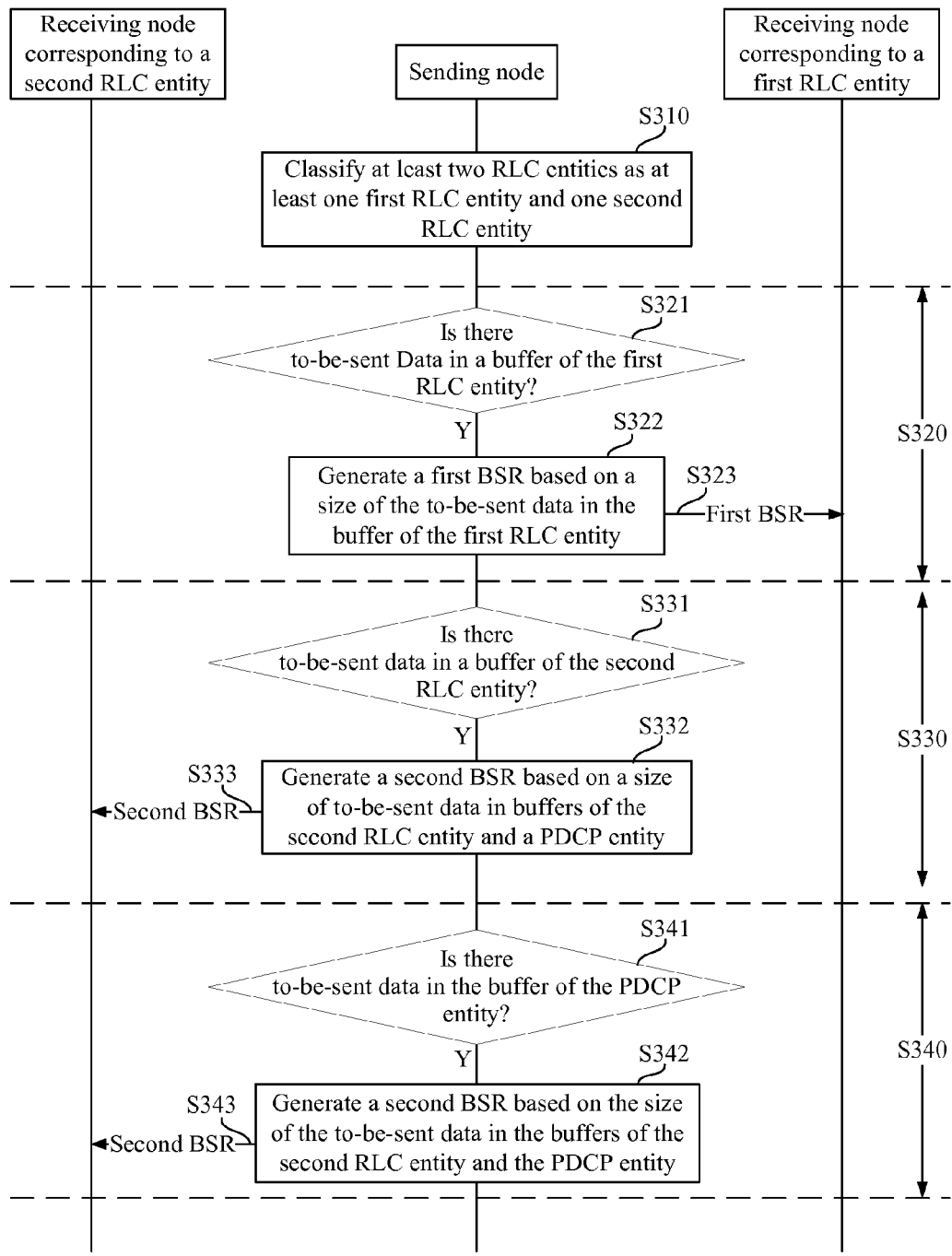
FIG. 3 is a flowchart of a buffer status reporting method according to an embodiment of the present invention.

FIG. 3 is a flowchart of a buffer status reporting method according to an embodiment of the present invention. As described above, the buffer status reporting method according to this embodiment is mainly applicable to a radio network architecture in which a sending node and receiving nodes are in a one-to-many correspondence, that is, the sending node includes one PDCP entity and multiple RLC entities. Each RLC entity in the multiple RLC entities is respectively corresponding to one receiving node. The PDCP entity is associated with the multiple RLC entities. For example, the PDCP entity is associated with the multiple RLC entities on a same bearer. In addition, the multiple RLC entities may all be in AM, or may all be in UM; or it may even further be that a part of the multiple RLC entities are in AM, and the other part of the multiple RLC entities are in UM.

The following introduces the buffer status reporting method shown in FIG. 3 in detail with reference to the sending node 100 shown in FIG. 2. As shown in FIG. 3, the buffer status reporting method mainly includes the following:

Step S310: The sending node 100 (which may specifically be the configuring unit 130) classifies the at least two RLC entities 120-1 to 120-N inside the sending node 100 as at least one first RLC entity and one second RLC entity, for example, as shown in FIG. 2, as the first RLC entities 120-2 to 120-N and the second RLC entity 120-1, where the second entity 120-1 is the only RLC entity that is associated with buffer status reporting of the PDCP entity 110.

Step S320: The sending node 100 (which may specifically be the generating unit 140), in a case in which a buffer of the first RLC entity includes to-be-sent data, generates a first BSR based on a size of the to-be-sent data in the buffer of the first RLC entity; and sends (which may be implemented by the sending unit 150) the first BSR to a receiving node corresponding to the first RLC entity.

In a specific possible implementation manner, as shown in FIG. 3, step S320 may specifically include the following:

Step S321: The sending node 100 (which may specifically be the generating unit 140) determines whether the buffer of the first RLC entity includes the to-be-sent data. Go to step S322 in a case in which a result of the determining is that the buffer of the first RLC entity includes the to-be-sent data.

Step S322: The sending node 100 (which may specifically be the generating unit 140) generates the first BSR based on the size of the to-be-sent data in the buffer of the first RLC entity. Then, go to step S323.

Step S323: The sending node 100 (which may specifically be the sending unit 150) sends the generated first BSR to the receiving node corresponding to the first RLC entity.

In a possible implementation manner, as shown in FIG. 3, the buffer status reporting method may further include:

Step S330: The sending node 100 (which may specifically be the generating unit 140), in a case in which a buffer of the second RLC entity includes to-be-sent data, generates a second BSR based on a size of to-be-sent data in buffers of the second RLC entity and the PDCP entity; and sends (which may be implemented by the sending unit 150) the second BSR to a receiving node corresponding to the second RLC entity; and/or Step S340: The sending node 100 (which may specifically be the generating unit 140), in a case in which a buffer of the PDCP entity includes to-be-sent data, generates a second BSR based on the size of to-be-sent data in the buffers of the second RLC entity and the PDCP entity; and sends (which may be implemented by the sending unit 150) the second BSR to the receiving node corresponding to the second RLC entity.

Further, in a specific possible implementation manner, as shown in FIG. 3, step S330 may specifically include the following:

Step S331: The sending node 100 (which may specifically be the generating unit 140) determines whether the buffer of the second RLC entity includes the to-be-sent data. Go to step S332 in a case in which a result of the determining is that the buffer of the second RLC entity includes the to-be-sent data.

Step S332: The sending node 100 (which may specifically be the generating unit 140) generates the second BSR based on the size of the to-be-sent data in the buffers of the second RLC entity and the PDCP entity. Then, go to step S333.

Step S333: The sending node 100 (which may specifically be the sending unit 150) sends the generated second BSR to the receiving node corresponding to the second RLC entity.

In addition, in a specific possible implementation manner, as shown in FIG. 3, step S340 may specifically include the following:

Step S341: The sending node 100 (which may specifically be the generating unit 140) determines whether the buffer of the PDCP entity includes the to-be-sent data. Go to step S342 in a case in which a result of the determining is that the buffer of the PDCP entity includes the to-be-sent data.

Step S342: The sending node 100 (which may specifically be the generating unit 140) generates the second BSR based on the size of the to-be-sent data in the buffers of the second RLC entity and the PDCP entity. Then, go to step S343.

Step S343: The sending node 100 (which may specifically be the sending unit 150) sends the generated second BSR to the receiving node corresponding to the second RLC entity.

It can be learned from the foregoing introduction that, only one RLC entity in multiple RLC entities included in a sending node is specified to be associated with buffer status reporting of a PDCP entity, so that when there is to-be-sent data in a buffer of the PDCP entity, only one receiving node is triggered to allocate a corresponding sending resource to the to-be-sent data. The foregoing buffer status reporting method according to this embodiment can effectively avoid a waste of sending resources in a case in which a sending node and receiving nodes are in a one-to-many correspondence.

It should be noted that, although FIG. 3 shows that steps S320, S330, and S340 are executed in sequence, a person skilled in the art should understand that an actual execution order is not limited hereto. For example, step S320 may be executed after step S330 and/or step S340, and may also be executed concurrently with step S330 and step S340. Step S332 in step S330 may even be combined with step S342 in step S340, and step S333 in step S330 may even be combined with S343 in step S340. In fact, after step S310 is executed to perform classification of the first RLC entity and the second RLC entity, whether steps S320, S330, and S340 are executed mainly depends on a buffer status of the PDCP entity, the first RLC entity, and the second RLC entity, and is independent of whether another step has already executed.

In a possible implementation manner, the sending node 100 may randomly perform classification of the first RLC entity and the second RLC entity, that is, arbitrarily specify any RLC entity in the RLC entities 120-1 to 120-N as the second RLC entity and other RLC entities as the first RLC entities.

In another possible implementation manner, the sending node 100 may perform classification of the first RLC entity and the second RLC entity according to a predetermined rule. For example, the sending node 100 may specify, according to numbers, an RLC entity with the smallest number in the RLC entities 120-1 to 120-N as the second RLC entity, and specify the other RLC entities as the first RLC entities. Alternatively, the sending node 100 may specify, according to buffer capacities, an RLC entity with the largest buffer capacity in the RLC entities 120-1 to 120-N as the second RLC entity, and specify the other RLC entities as the first RLC entities.

In still another possible implementation manner, the sending node 100 may perform classification of the first RLC entity and the second RLC entity according to an indication of the receiving nodes 200-1 to 200-N. For example, the sending node 100 may receive a first indication from the receiving nodes 200-1 to 200-N, where the first indication is used to specify an RLC entity that is only used to send a control PDU. In this case, in step S310, the sending node 100 (which may specifically be the configuring unit 130) may classify the RLC entity specified by the first indication as the first RLC entity. For another example, the sending node 100 may receive a second indication from receiving nodes 200-1 to 200-N, where the second indication is used to specify an RLC entity that is used to send a PDU submitted by the PDCP entity. In this case, in step S310, the sending node 100 (which may specifically be the configuring unit 130) may classify the RLC entity specified by the second indication as the second RLC entity, and classify the other RLC entities as the first RLC entities.

Figure 4:
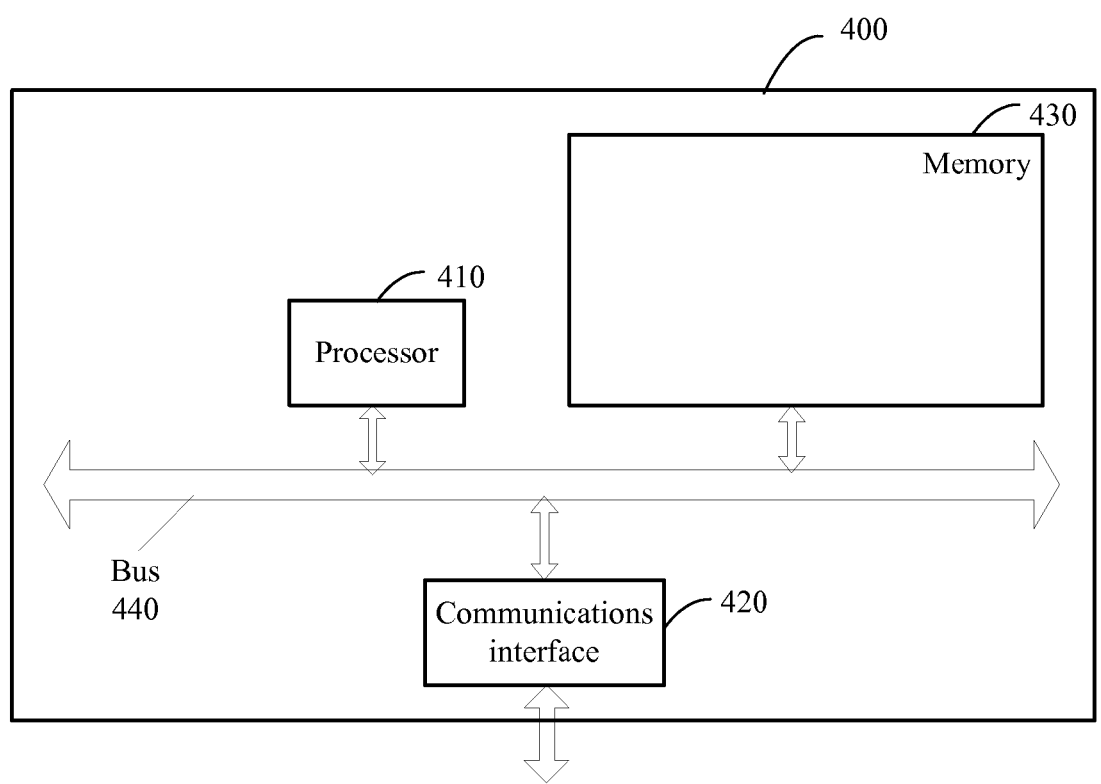
FIG. 4 is a structural block diagram of a sending node according to another embodiment of the present invention.

FIG. 4 is a structural block diagram of a sending node device 400 according to an embodiment of the present invention. A sending node device 400 may be a host server with a computing capability, a personal computer PC, a portable computer, a terminal, or the like. A specific implementation of the sending node device is not limited in a specific embodiment of the present invention.

The sending node device 400 includes a processor 410, a communications interface 420, a memory 430, and a bus 440. The processor 410, the communications interface 420, and the memory 430 communicate with each other by using the bus 440.

The communications interface 420 is configured to communicate with a network device, where the network device includes, for example, a virtual machine management center, or a shared memory.

The processor 410 is configured to execute a program. The processor 410 may be a central processing unit (CPU), or an application-specific integrated circuit (ASIC), or one or more integrated circuits that are configured to implement this embodiment of the present invention.

The memory 430 is configured to store a file. The memory 430 may include a high speed RAM memory, and may also include a non-volatile memory, for example, at least one disk storage. The memory 430 may also be a memory array. The memory 430 may also be divided into blocks, and the blocks may be combined to form a virtual volume according to a specific rule.

In a possible implementation manner, a program stored in the memory 430 may be program code that includes a computer operating instruction. The processor 410 may specifically execute the following steps by running the program: classifying at least two RLC entities included in a sending node as at least one first RLC entity and one second RLC entity, where the at least two RLC entities are all associated with a PDCP entity included in the sending node; in a case in which a buffer of the first RLC entity includes to-be-sent data, generating a first buffer status report BSR based on a size of the to-be-sent data in the buffer of the first RLC entity; and sending the first BSR to a receiving node corresponding to the first RLC entity.

In a possible implementation manner, the process 410 may further execute the following steps by running the program: in a case in which a buffer of a PDCP entity and/or a second RLC entity includes to-be-sent data, generating a second BSR based on a size of to-be-sent data in buffers of the PDCP entity and the second RLC entity; and sending the second BSR to a receiving node corresponding to the second RLC entity.

In a possible implementation manner, the processor 410 may further execute the following steps by running the program: receiving a first indication from a receiving node; and classifying an RLC entity specified by the first indication as the first RLC entity. The first indication is used to specify an RLC entity, which is only used to send a control protocol data unit PDU, in at least two RLC entities.

In a possible implementation manner, the processor 410 may further execute the following steps by running the program: receiving a second indication from a receiving node; and classifying an RLC entity specified by the second indication as a second RLC entity. The second indication is used to specify an RLC entity, which is used to send a PDU submitted by the PDCP entity, in at least two RLC entities.

Figure 5:
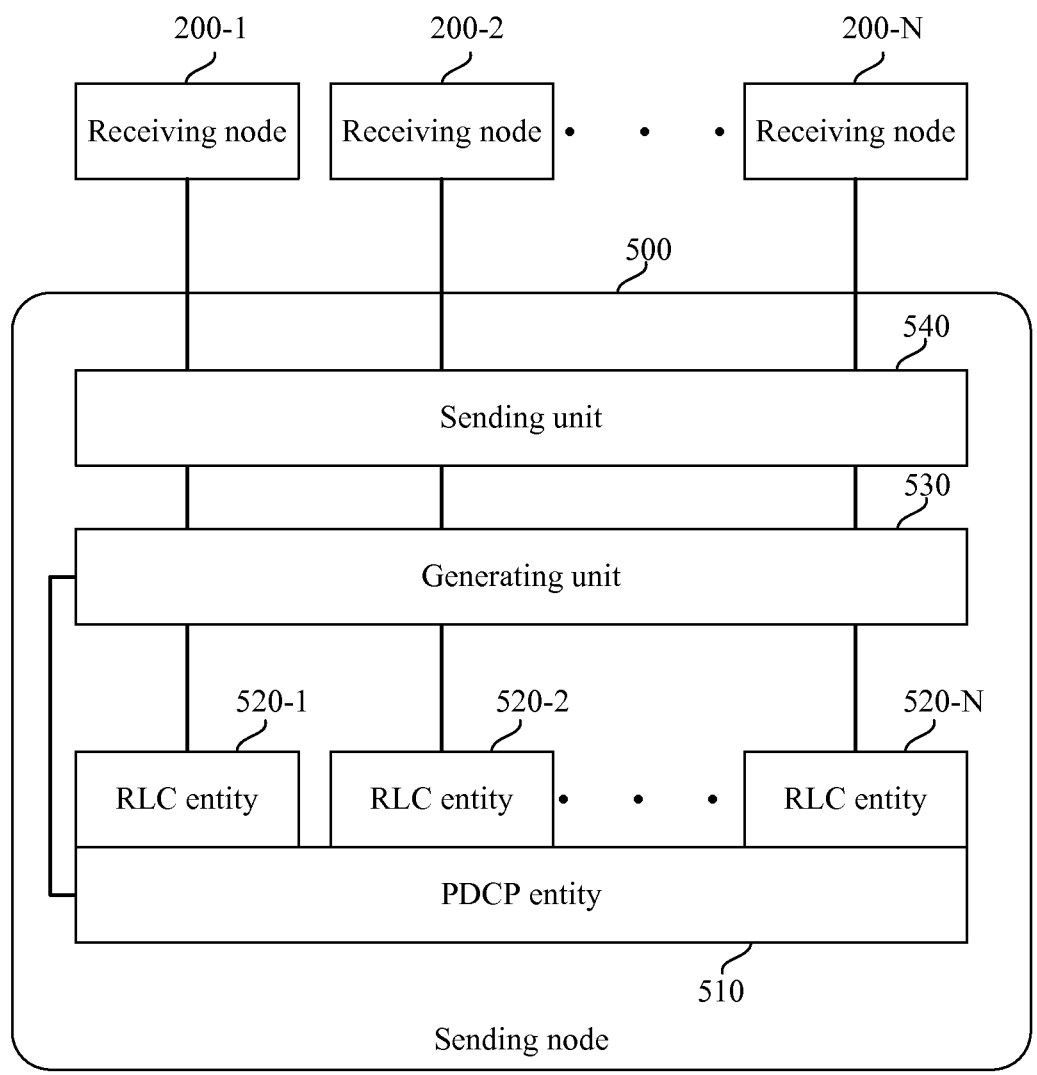
FIG. 5 is a structural block diagram of a sending node according to still another embodiment of the present invention.

FIG. 5 is a structural block diagram of a sending node 500 according to an embodiment of the present invention. As shown in FIG. 5, a sending node 500 includes one PDCP entity 510 and N RLC entities 520-1 to 520-N, so as to send data to N receiving nodes 200-1 to 200-N, where N is a positive integer greater than or equal to 2. That is, the sending node 500 according to this embodiment is applicable to a radio network architecture in which a sending node and receiving nodes are in a one-to-many correspondence. In a possible implementation manner, the sending node 500 and the receiving nodes 200 may all be terminals, base stations, or access points.

To effectively avoid a waste of resources in allocation of sending resources, as shown in FIG. 5, the sending node 500 may further include a generating unit 530, and a sending unit 540. The generating unit 530 is mainly configured to, in a case in which a buffer of any RLC entity 520-i ($1 \le i \le N$) or the PDCP entity 510 includes to-be-sent data, generate a buffer status report BSR based on a size of to-be-sent data in buffers of all the RLC entities 520-1 to 520-N and the PDCP entity 510. The sending unit 540 is connected to the generating unit 530 and is mainly configured to send the BSR generated by the generating unit 530 to a receiving node 200-j corresponding to any RLC entity 520-j ($1 \le j \le N$).

In this way, a BSR, which is triggered when there is to-be-sent data in a buffer of any RLC entity or a PDCP entity, is generated based on a size of to-be-sent data in buffers of all RLC entities and a PDCP entity by using a generating unit; and the generated BSR is sent, by using a sending unit, to a receiving node corresponding to any RLC entity, so that only one receiving node is triggered, when there is to-be-sent data in the buffer of the PDCP entity, to allocate a corresponding sending resource to the to-be-sent data. The sending node according to this embodiment can effectively avoid a waste of sending resources in a case in which a sending node and receiving nodes are in a one-to-many correspondence.

Figure 6:
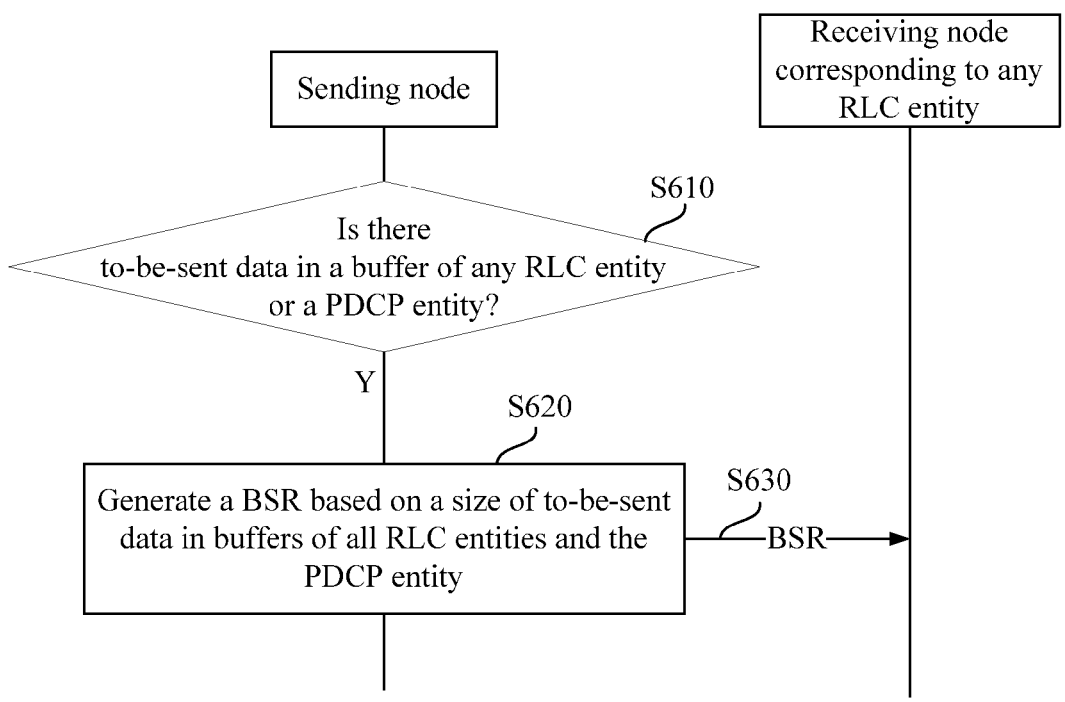
FIG. 6 is a flowchart of a buffer status reporting method according to another embodiment of the present invention.

FIG. 6 is a flowchart of a buffer status reporting method according to another embodiment of the present invention. As described above, the buffer status reporting method according to this embodiment is mainly applicable to a radio network architecture in which a sending node and receiving nodes are in a one-to-many correspondence, that is, the sending node includes one PDCP entity and multiple RLC entities. Each RLC entity in the multiple RLC entities is respectively corresponding to one receiving node. The PDCP entity is associated with the multiple RLC entities. For example, the PDCP entity is associated with the multiple RLC entities on a same bearer. In addition, the multiple RLC entities may all be in AM, or may all be in UM; or it may even further be that a part of the multiple RLC entities are in AM, and the other part of the multiple RLC entities are in UM.

The following introduces the buffer status reporting method shown in FIG. 6 in detail with reference to the sending node 500 shown in FIG. 5. As shown in FIG. 6, the buffer status reporting method mainly includes the following:

Step S610: Determine whether a buffer of any RLC entity 520-i ($1 \le i \le N$) or the PDCP entity 510 includes to-be-sent data, and go to step S620 in a case in which a result of the determining is that buffer of the RLC entity 520-i ($1 \le i \le N$) or the PDCP entity 510 includes the to-be-sent data.

Step S620: Generate a buffer status report BSR based on a size of to-be-sent data in buffers of all the RLC entities 520-1 to 520-N and the PDCP entity 510, and then go to step S630.

Step S630: Send the generated BSR to a receiving node 200-j corresponding to any RLC entity 520-j ($1 \le j \le N$).

It can be learned from the foregoing introduction, a BSR, which is triggered when there is to-be-sent data in a buffer of any RLC entity or a PDCP entity, is generated based on a size of to-be-sent data in buffers of all RLC entities and the PDCP entity; and the generated BSR is sent to a receiving node corresponding to any RLC entity, so that only one receiving node is triggered, when there is to-be-sent data in the buffer of the PDCP entity, to allocate a corresponding sending resource to the to-be-sent data. The buffer status reporting method according to this embodiment can effectively avoid a waste of sending resources in a case in which a sending node and receiving nodes are in a one-to-many correspondence.

Figure 7:
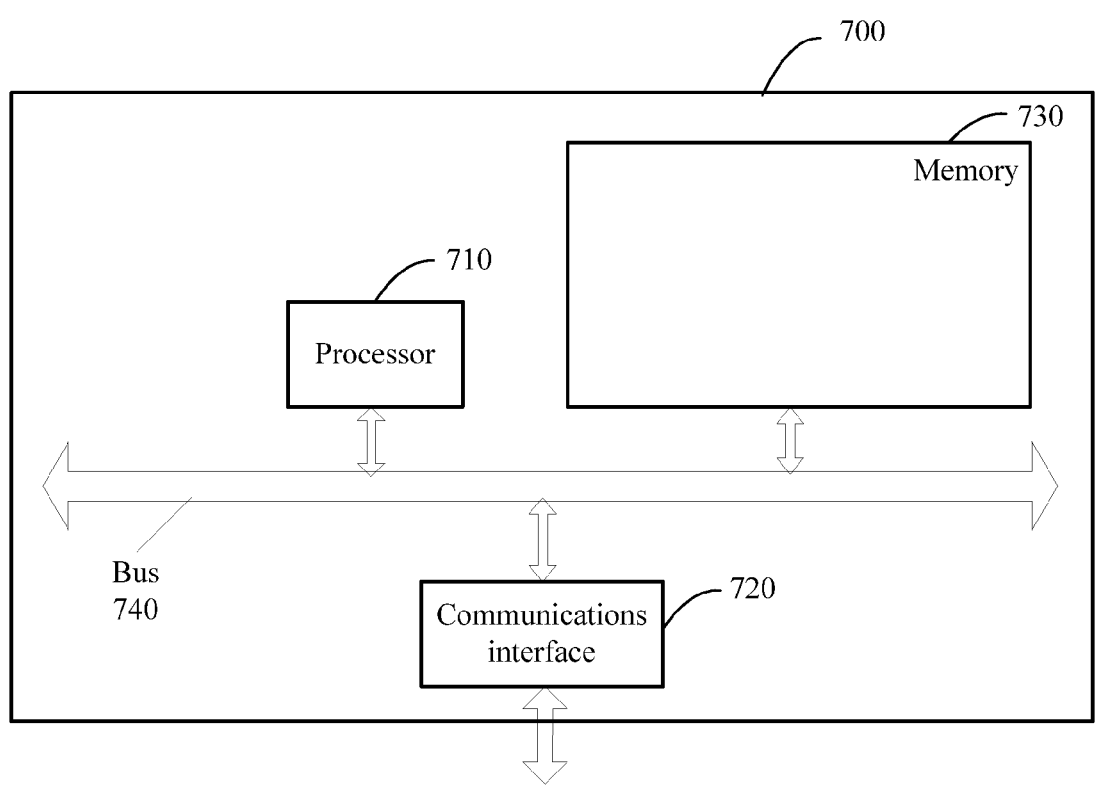
FIG. 7 is a structural block diagram of a sending node according to yet another embodiment of the present invention

FIG. 7 is a structural block diagram of a sending node device 700 according to yet another embodiment of the present invention. The sending node device 700 may be a host server with a computing capability, a personal computer PC, a portable computer, a terminal, or the like. A specific implementation of the sending node device is not limited in a specific embodiment of the present invention.

The sending node device 700 includes a processor 710, a communications interface 720, a memory 730, and a bus 740. The processor 710, the communications interface 720, and the memory 730 communicate with each other by using the bus 740.

The communications interface 720 is configured to communicate with a network device, where the network device includes, for example, a virtual machine management center, or a shared memory.

The processor 710 is configured to execute a program. The processor 710 may be a central processing unit (CPU), or an application-specific integrated circuit (ASIC), or one or more integrated circuits that are configured to implement this embodiment of the present invention.

The memory 730 is configured to store a file. The memory 730 may include a high speed RAM memory, and may also include a non-volatile memory, for example, at least one disk storage. The memory 730 may also be a memory array. The memory 730 may also be divided into blocks, and the blocks may be combined to form a virtual volume according to a specific rule.

In a possible implementation manner, a program stored in the memory 730 may be program code that includes a computer operating instruction. The processor 710 may specifically execute the following steps by running the program: in a case in which a buffer of any RLC entity or a PDCP entity, which is included in a sending node, includes to-be-sent data, generating a buffer status report BSR based on a size of to-be-sent data in buffers of all RLC entities and the PDCP entity; and sending the BSR to a receiving node corresponding to any RLC entity, where the RLC entities are all associated with the PDCP entity.

A person of ordinary skill in the art can be aware that, each exemplary unit and algorithm step in the embodiments described in this specification can be implemented by electronic hardware, or a combination of computer software and electronic hardware. Whether the functions are implemented by hardware or software depends on particular applications and design constraint conditions of the technical solutions. A person skilled in the art can use different methods to implement the described functions for every particular application, but it should not be considered that the implementation goes beyond the scope of the present invention.

If the functions are implemented in a form of computer software and are sold or used as independent products, it can be considered to a certain extent that all or a part of (for example, the part contributing to the prior art) the technical solutions of the present invention are implemented in a form of a computer software product. The computer software product is generally stored in a computer readable non-volatile storage medium, and includes several instructions for instructing a computer device (which may be a personal computer, a server, or a network device) to perform all or part of the steps of the methods provided in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

Practicability

A sending node and a buffer status reporting method that are provided according to embodiments of the present invention can be applied to the radio network field, and in particular, are applicable to a scenario in which a sending node and receiving nodes are in a one-to-many correspondence, which can effectively avoid a waste of sending resources in allocation of sending resources performed by a receiving node in response to a buffer status report reported by the sending node.

What is claimed is:

1. A buffer status reporting method, comprising:
    classifying, by a sending node comprising a Packet Data Convergence Protocol (PDCP) entity and at least two Radio Link Control (RLC) entities associated with the PDCP entity, the at least two RLC entities as a first RLC entity and a second RLC entity;
    sending, by the sending node, a first buffer status report (BSR) to a first receiving node corresponding to the first RLC entity, wherein the first BSR is generated according to a size of to-be-sent data in a buffer of the first RLC entity without according to a size of to-be-sent data in a buffer of the PDCP entity when the buffer of the first RLC entity comprises the to-be-sent data in the buffer of the first RLC entity; and,
    sending, by the sending node, a second BSR to a second receiving node corresponding to the second RLC entity, wherein the second BSR is generated according to the size of to-be-sent data in the buffer of the PDCP entity and a size of to-be-sent data in a buffer of the second RLC entity when the buffer of the PDCP entity comprises the to-be-sent data in the buffer of the PDCP entity or the buffer of the second RLC entity comprises the to-be-sent data in the buffer of the second RLC entity.

2. The buffer status reporting method according to claim 1, wherein the classifying, by the sending node, of the at least two RLC entities as a first RLC entity and a second RLC entity comprises:
    receiving, by the sending node, a first indication from a third receiving node, wherein the first indication is used to specify an RLC entity of the at least two RLC entities and which is only used to send a control protocol data unit (PDU); and
    classifying, by the sending node, the RLC entity specified by the first indication as the first RLC entity and a rest of the at least two RLC entities as the second RLC entity.

3. The buffer status reporting method according to claim 1, wherein the classifying the at least two RLC entities as a first RLC entity and a second RLC entity comprises:
    receiving, by the sending node, a second indication from a third receiving node, wherein the second indication is used to specify an RLC entity of the at least two RLC entities that sends a PDU submitted by the PDCP entity; and
    classifying, by the sending node, the RLC entity specified by the second indication as the second RLC entity and a rest of the at least two RLC entities as the first RLC entity.

4. The buffer status reporting method according to claim 3, wherein the third receiving node is the first receiving node or the third receiving node is the second receiving node.

5. The buffer status reporting method according to claim 1, wherein the at least two RLC entities are all associated with the PDCP entity on a same bearer.

6. The buffer status reporting method according to claim 1, wherein each of the at least two RLC entities are in acknowledged mode (AM).

7. The buffer status reporting method according to claim 1, wherein the sending node is a terminal, a base station, or an access point.

8. A sending node, comprising:
    a Packet Data Convergence Protocol (PDCP) entity;
    at least two Radio Link Control (RLC) entities, wherein each of the at least two RLC entities are associated with the PDCP entity;
    a processor, configured to
        classify the at least two RLC entities as a first RLC entity and a second RLC entity; and
    a transceiver, configured to send a first buffer status report (BSR) to a first receiving node corresponding to the first RLC entity, wherein the first BSR is generated according to a size of to-be-sent data in a buffer of the first RLC entity without according to a size of to-be-sent data in a buffer of the PDCP entity when the buffer of the first RLC entity comprises the to-be-sent data in the buffer of the first RLC entity; and configured to send a second BSR to a second receiving node corresponding to the second RLC entity, wherein the second BSR is generated according to the size of to-be-sent data in the buffer of the PDCP entity and a size of to-be-sent data in a buffer of the second RLC entity when the buffer of the PDCP entity comprises the to-be-sent data in the buffer of the PDCP entity or the buffer of the second RLC entity comprises the to-be-sent data in the buffer of the second RLC entity.

9. The sending node according to claim 8, wherein the transceiver is further configured to:
    receive a first indication from a third receiving node, wherein the first indication is used to specify an RLC entity of the at least two RLC entities and which is only used to send a control protocol data unit (PDU); and
    the processor is further configured to classify the RLC entity specified by the first indication as the first RLC entity and a rest of the at least two RLC entities as the second RLC entity.

10. The sending node according to claim 8, wherein the transceiver is further configured to:
    receive a second indication from a third receiving node, wherein the second indication is used to specify an RLC entity of the at least two RLC entities that sends a PDU submitted by the PDCP entity; and the processor is further configured to classify the RLC entity specified by the second indication as the second RLC entity and a rest of the at least two RLC entities as the first RLC entity.

11. The sending node according to claim 10, wherein the third receiving node is the first receiving node or the third receiving node is the second receiving node.

12. The sending node according to claim 8, wherein each of the at least two RLC entities are associated with the PDCP entity on a same bearer.

13. The sending node according to claim 8, wherein each of the at least two RLC entities are in acknowledged mode (AM).

14. The sending node according to claim 8, wherein the sending node is a terminal, a base station, or an access point.

15. A buffer status reporting method, comprising:
classifying, by a sending node comprising a Packet Data Convergence Protocol (PDCP) entity and at least two Radio Link Control (RLC) entities associated with the PDCP entity, the at least two RLC entities as at least one first RLC entity and one second RLC entity;
only generating, by the sending node and in response to determining that a buffer of the PDCP entity comprises to-be-sent data, a buffer status report (BSR) according to a size of the to-be-sent data in the buffer of the PDCP entity and a size of to-be-sent data in a buffer of the one second RLC entity;
sending, by the sending node, the BSR to a receiving node corresponding to the one second RLC entity;
only generating, by the sending node and in response to determining that a buffer of the at least one first RLC entity comprises to-be-sent data and the buffer of the PDCP entity does not comprise to-be-sent data, an another BSR according to a size of the to-be-sent data in the buffer of the at least one first RLC entity; and
sending, by the sending node, the another BSR to a receiving node corresponding to the at least one first RLC entity.

16. The buffer status reporting method according to claim 15, wherein the classifying, by the sending node, of the at least two RLC entities as at least one first RLC entity and one second RLC entity comprises:
receiving, by the sending node, a first indication from a receiving node, wherein the first indication is used to specify an RLC entity of the at least two RLC entities and which is only used to send a control protocol data unit (PDU); and
classifying, by the sending node, the RLC entity specified by the first indication as the at least one first RLC entity.

17. The buffer status reporting method according to claim 15, wherein the classifying the at least two RLC entities as the at least one first RLC entity and the one second RLC entity comprises:
receiving, by the sending node, a second indication from a receiving node, wherein the second indication is used to specify an RLC entity of the at least two RLC entities that sends a PDU submitted by the PDCP entity; and
classifying, by the sending node, the RLC entity specified by the second indication as the one second RLC entity.

18. The buffer status reporting method according to claim 15, wherein the at least two RLC entities are all associated with the PDCP entity on a same bearer.

19. The buffer status reporting method according to claim 15, wherein each of the at least two RLC entities are in acknowledged mode (AM).

* * * * *